US007203340B2

United States Patent
Gorodnichy

(10) Patent No.: US 7,203,340 B2
(45) Date of Patent: Apr. 10, 2007

(54) SECOND ORDER CHANGE DETECTION IN VIDEO

(75) Inventor: Dmitry O. Gorodnichy, Ottawa (CA)

(73) Assignee: National Research Council of Canada, Ottawa (CA)

( * ) Notice: Subject to any disclaimer, the term of this patent is extended or adjusted under 35 U.S.C. 154(b) by 705 days.

(21) Appl. No.: 10/653,090

(22) Filed: Sep. 3, 2003

(65) Prior Publication Data

US 2005/0047662 A1    Mar. 3, 2005

(51) Int. Cl.
*G06K 9/00* (2006.01)
(52) U.S. Cl. .................................. 382/103; 382/218
(58) Field of Classification Search ................ 382/103, 382/218; 386/4, 46, 58, 69, 78; 375/240.1, 375/240.25; 715/716; 348/169, 333.03, 348/412.1, 584, 700
See application file for complete search history.

(56) References Cited

U.S. PATENT DOCUMENTS

| | | | | |
|---|---|---|---|---|
| 5,636,036 | A * | 6/1997 | Ashbey .......................... | 386/8 |
| 6,185,314 | B1 * | 2/2001 | Crabtree et al. ............. | 382/103 |
| 6,275,532 | B1 * | 8/2001 | Hibi et al. ............. | 375/240.17 |
| 6,580,811 | B2 * | 6/2003 | Maurer et al. ............... | 382/103 |
| 6,711,278 | B1 * | 3/2004 | Gu et al. .................... | 382/103 |

OTHER PUBLICATIONS

Piccardi, Massimo et al; Recent Advances in Computer Vision; The Industrial Physicist; Feb./Mar. 2003; pp. 18-21.

Gorodnichy, Dmitry O.; On Importance of Nose for Face Tracking; Computational Video Group, IIT, May 2002, pp. 1-6.

Hjelmas, Erik et al; Face Dtection: A Survey; Computer Vision and Image Understanding; 2001, pp. 236-274.

(Continued)

*Primary Examiner*—Matthew C. Bella
*Assistant Examiner*—Abolfazl Tabatabai
(74) *Attorney, Agent, or Firm*—Cassan Maclean

(57) ABSTRACT

Methods and devices for processing captured video frames to detect specific changes observable in video using three consecutive video frames. The images in the first video frame are compared with the second frame and the images of the second frame are compared with the third frame to produce two intermediate images which show the first order change observable in video. These interim images are then analyzed. A geometric transformation is found such that when the transformation is applied to one of these intermediate images, the number of pixels which match between the interim is maximized. This geometric transformation, which may include a linear as well as a rotational component, is then applied to one of the intermediate images to result in a transformed image. The transformed image is then subtracted from the other intermediate image to arrive at an end image which shows the second order change or the change in a change observable in video. The second order change image will show only those specific pixels which have changed in the images between the three original video frames. The invention may be used to detect changes in the state of a subject's eyes. A subject's blinking can thus be used for sending binary commands to a computer remotely. In particular, a double blink, i.e., two consecutive blinks, of a person can be used as a hand-free substitute to a clicking of a mouse.

24 Claims, 2 Drawing Sheets

OTHER PUBLICATIONS

Yang, Ming-Hsuan et al; Detecting Faces in Images: A Survey; IEEETransactions on Pattern Analysis and Machine Intelligence, vol. 24 No. 1, Jan. 2002, pp. 34-58.

Kawato, Shinjiro et al; Detection Tracking of Eyes for Gaze-Camera Control; pp. 1-6.

Berard, Francois et al; Robust computer vision for computer mediated communications; INTERACT '97; 1997; pp. 1-2.

Grauman, Kristen et al; Communications via eye blinks—detection and duration analysis in real time; IEEE; 2001; pp. 1-8.

Zhu. Zhiwei; Combining Kalman filtering and mean shift for real time eye tracking under active IR illumination; IEEE 2002; pp. 318-321.

Moriyama, Tsuyoshi; Automatic recognition of eye blinking in spontaneously occurring behavior; IEEE 2002; pp. 1-4.

Bradski, Gary R.; Computer vision face tracking for use in a perceptual user interface; Intel Technology Journal, 1998; pp. 1-15.

Betke, Margrit; The camera mouse; visual tracking of body features . . . for people with severe disabilities; IEEE, vol. 10, No. 1 Mar. 2002; pp. 1-10.

Morimoto, Carlos; Real-time multiple face detection using active illumination; IEEE; Mar. 2000; pp. 1-6.

Coutaz, Joelle et al; CoMedi: using computer vision to support awareness and privacy in mediaspaces; 1999; pp. 1-3.

Gorodnichy, D.O.; Nouse Use your nose as a joystick or a mouse a new technology for hands-free games and interfaces; 2002; pp. 1-7.

\* cited by examiner

SECOND ORDER CHANGE DETECTION IN VIDEO

FIELD OF THE INVENTION

The present invention relates to video image processing and, more specifically, relates to but is not limited to methods and devices for determining minute changes occurring between consecutive video frames.

BACKGROUND TO THE INVENTION

The field of human-computer interfaces is a growing one. From the evolution of the keyboard to the invention of the mouse, newer and better means for interacting with computers have always been sought. One seeming constant in past and current interfaces has been the requirement for human hands, digits, or other physical appendages to manipulate some sort of implement to interact with a computer. Keyboards, mice, light pens, track balls and other human-computer interfaces all require human interaction and physical manipulation of at least some part of the interface.

Unfortunately, all of the above interfaces are inaccessible to people who are incapable of physically manipulating such interfaces. While some speech driven interfaces are available, these are far from ideal. Navigating a graphical user interface using speech can be quite difficult and "training" the software to recognize the users voice patterns and commands is time consuming.

For a vision based interface to be fully operational, it has to be able to do two tasks. First, it should be able to track a human face both robustly—with respect to head motion, and precisely—with subpixel precision, so that its position can be converted to a position of a cursor or another virtual object in a 2D screen. Second, the interface should be able to detect a facial expression event. This facial expression event would be used by a user to send a binary "on/off" command to the system, a command that is analogous to a mouse "click" event.

The recently developed Nouse "Use your nose as a mouse" tracking technology made it possible to track a liberally unconstrained head motion with subpixel precision, thereby offering a solution to the first of these two tasks. For more information on the Nouse technology, see Gorodnichy (Gorodnichy, "On Importance of nose for face tracking", Proc. IEEE Intern. Conf. On Automatic Face and Gesture Recognition (FG'2002), Washington D.C., 2002), Gorodnichy et al (Gorodnichy, Malik, and Roth, "Nouse—A New Technology for Hands-free Games and Interfaces", Proc. Intern. Conf. On Vision Interface (VI'2002), Calgary, 2002), and www.perceptual-vision.com.

While head-tracking technologies such as the Nouse show promise, they still have one drawback that makes them fall short of the mouse in terms of ease of use. Some head-tracking technologies propose the sending of binary commands such as "clicking" using eye blinks. However, detecting eye based binary commands, such as blinks and double-blinks, have previously proved difficult and results have been poor. One major problem has been the difficulty in determining how to locate a person's eyes when his face moves. Given the non-static nature of the human head, this is not a trivial problem and previous attempts to solve it has met with, at best, mixed results. Such a drawback limits the usability of such head-tracking methods and technologies.

A common approach to detecting moving objects in video is based on detecting the intensity change between two consecutive frames caused by the object motion. The simplest way of detecting such a change, which will be referred to as a first order change, is to use two consecutive video frames to decide where such a change occurred. This is what has been used so far to detect blinks. However, this technique fails to detect eyes when a face moves as many candidates also appear around the face boundary as well as around the nose, mouth, and other parts of the face.

Based on the above, there is therefore a need for methods and/or devices that can be used to allow for clicking in conjunction with head-tracking technologies. Such methods and/or devices may also have other applications in the image processing field.

SUMMARY OF THE INVENTION

The present invention relates to methods and devices for processing captured video frames to detect specific changes observable in video using three consecutive video frames. The images in the first video frame are compared with the second frame and the images of the second frame are compared with the third frame to produce two intermediate images which show the first order change observable in video. These interim images are then analyzed. A geometric transformation is found such that when the transformation is applied to one of these intermediate images, the number of pixels which match between the interim is maximized. This geometric transformation, which may include a linear as well as a rotational component, is then applied to one of the intermediate images to result in a transformed image. The transformed image is then subtracted from the other intermediate image to arrive at an end image which shows the second order change or the change in a change observable in video. The second order change image will show only those specific pixels which have changed in the images between the three original video frames. The invention may be used to detect changes in the state of a subject's eyes. A subject's blinking can thus be used for sending binary commands to a computer remotely. In particular, a double blink, i.e., two consecutive blinks, of a person can be used as a hand-free substitute to a clicking of a mouse.

In a first embodiment, the present invention provides a method of detecting changes in video, the method comprising:

(a) obtaining at least three video frames;

(b) selecting one of said at least three video frames as a starting video frame;

(c) selecting a second one of said at least three video frames as an ending video frame;

(d) selecting a third one of said at least three video frames as a middle video frame, said middle video frame being between said starting video frame and said ending video frame in a time sequence of said at least three video frames;

(e) creating a first intermediate image based on differences computed between said starting video frame and said middle video frame;

(f) creating a second intermediate image based on differences computed between said middle video frame and said ending video frame;

(g) determining a geometric transformation such that when said geometric transformation is applied to said second intermediate image, an overlap between images in said first intermediate image and images in said second intermediate image is maximized;

(h) applying said geometric transformation to said second intermediate video frame to result in a transformed image;

(i) constructing an end image based on similarities between said first intermediate image and said second intermediate image such that active pixels common to both intermediate images are inactive in said end image.

In a second embodiment, the present invention provides a method of determining differences between three source images, the method comprising:

a) creating two intermediate images based on differences between said source images;

b) geometrically transforming one of said two intermediate images such that an overlap of elements in said two intermediate images is maximized;

c) creating an end image based on differences between a transformed one of said intermediate image and said other image, said end image containing differences between said three images.

BRIEF DESCRIPTION OF THE DRAWINGS

A better understanding of the invention will be obtained by considering the detailed description below, with reference to the following drawings in which.

DETAILED DESCRIPTION

As is well-known, one problem with detecting a change in the open or closed state of eyes in successive video frames is finding which change in the image is caused by eye lid motion and which is caused by head motion. Since the human head is moving, even minutely, between frames, there are frequently elements in the image which have changed because of head motion, such as around brows, lips, nostrils, as well as around the hair line and head boundary. Changes caused by eye lid motion will be easier to detect if those changes caused by head motion, which may be referred to as global changes, can be detected and removed from the consideration.

Figure 1:
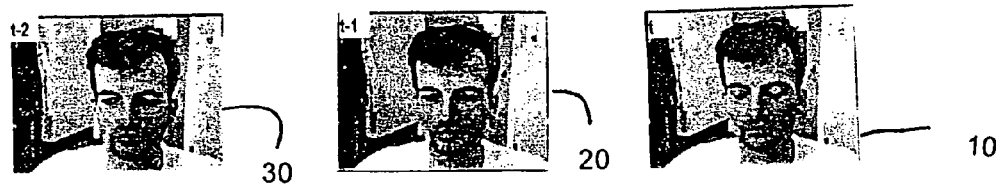
FIG. 1 is a series of video frames illustrating a subject deliberately blinking his eyes.

The above detection and removal from consideration of global changes can be done by using at least three successive video frames. Referring to FIG. 1, three successive video frames are illustrated with the subject of the frames closing his eyes in the first frame 10. As can be seen, between the third frame 30 and the second frame 20, the subject has moved, although quite minimally. Between the second 20 and the first frames 10, the subject has, again, moved and has closed his eyes. It is this change (the closing of the eyes) that needs to be tracked.

Such a change can be termed a second order change with a first order change being merely a change in the position of a subject in the frame. A second order change is therefore a change in the first order change or a change in the change.

Figure 2:
FIG. 2 is a series of intermediate video frames resulting from selected image subtractions of the frames in FIG. 1 and an end image.

To detect such second order changes, the global changes, or changes caused by motion of the subject in the frames, are detected, co-related and removed to arrive at a frame that only contains the local changes such as eye lid motion. This can be done by first subtracting the pixels (or elements) of the second frame 20 (the middle video frame) from the elements in the first frame 10 (the starting video frame). This results in a first intermediate video frame 40 (see FIG. 2).

A second intermediate video frame 50 is obtained by subtracting the elements of the third frame 30 (the ending video frame) from the elements of the second frame 20. As can be seen from FIG. 2, the intermediate video frames 40, 50 only have light pixels where there were differences between the two source frames.

The two intermediate video frames are then subtracted from one another to determine what changes occurred across the three source frames. However, to do this properly, the two intermediate frames have to be co-related so that the matching of the pixels between two intermediate frames is maximized. This can be done by determining a geometric transformation which matches as many pixels in the first intermediate frame with as many pixels in the second intermediate frame. The geometric transformation, which may be a linear translation of the frame (moving the frame such that each pixel in the frame is moved along a vector V(vi,vj) to a new location) or a rotational translation of the frame (rotating the frame by an angle R about the center of the frame) or a combination of the two would maximize an overlap between pixels in the two intermediate frames. For purposes of this document, overlap between two pixels in different frames is defined as occurring when two pixels in different frames have the same coordinates/position and the same value. Correspondence between pixels in different frames is said to occur when the two pixels have the same coordinates/position.

Once the geometric transformation is found, it is applied to the second intermediate frame to result in a transformed video frame. The elements of the transformed video frame are then subtracted from the elements of the first intermediate frame. The end video frame 60 which results only has the pixels not common to both the intermediate video frames. As can be seen from the end video frame 60, the two white dots correspond to the changed state of the eyes between the first frame 10 and the third frame 30. The pixels in the end video frame 60 (and in the intermediate frames) are created by comparing the values of corresponding pixels in different frames and, when there is overlap, assigning one value to the pixel in the frame being constructed. If there is no overlap between the pixels being compared, then the pixel in the frame being constructed is assigned another value. The overlap between pixels can be calculated as a sum of absolute differences between corresponding pixels.

Figure 3:
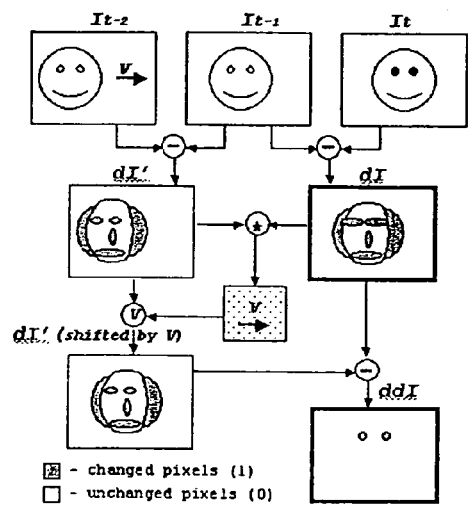
FIG. 3 is a schematic illustration of the a process for detecting changes in consecutive video still frames.

Schematically, the process is illustrated in FIG. 3 where $I_{t-2}$ corresponds to the first frame 30 (open eyes), $I_{t-1}$ corresponds to the second frame 20 (head movement but still open eyes), and $I_t$ corresponds to the third frame 10 (close eyes). As can be seen, two image subtractions are performed to result in the two intermediate frames, dI' and dI.

Analysis provides a geometric transformation (in this case a vector $\bar{v}$) and intermediate frame dI' is shifted (transformed) by this vector $\bar{v}$ to arrive at the transformed video frame dI' (shifted by V). This is then subtracted from the intermediate frame dI to result in the end video frame ddI.

As a more general mathematical relationship, the geometric transformation of the image being transformed can be expressed in terms of the pixel position of the resulting image. If a pixel in the image to be transformed is U(i,j), then the transformed pixel is given by U'(i',j') where $$i' = \cos R * i + \sin R * j + vi$$

$$j' = \sin R * i - \cos R * j + vj$$

where R is a rotation angle and V(vi,vj) is a vector which corresponds to the linear translation referred to above.

The above process can, as illustrated, be used to track changes in the state of a person's eyes. It has been found that, to assist in the image subtraction and in the calculation of the geometric transformation by matching pixels, the video frames can be in black and white as opposed to colour. Furthermore, digitizing the video frames also significantly assists in the calculations as the process can be automated.

The above process is suitable for use in conjunction with the Nouse technology discussed above. By using video frames from a regular digital camera such as those commonly known as web cams, the above process can be used to localize a user's eye blinks. These blinks can then be used to generate "clicks" events which, in conjunction with the Nouse results in a completely hands-free alternative to a mouse or joystick for use in a graphical user interface.

Since the above use will utilize low quality video cameras, detecting changed pixels may be problematic. Thus, a changed pixel detector which is tolerant of noise and illumination changes is recommended. A non-linear change detection method, in which a pixel is considered to have changed only if the area around the pixel (the pixels support area) has changed non-linearly, may be used. Detecting non-linear change may be done by comparing vectors $x_t = \{x_{i,t}\}$ and $x_{t+1} = \{x_{i,t+1}\}$, i=1 . . . n created from pixel intensities in the support area of pixel x in frames $I_t$ and $I_{t+1}$ respectively. The support area n is typically taken to be 3×3 pixels around pixel x. If these two vectors are collinear, meaning that the intensity change is linear, then there was no motion observed in pixel x. If the two vectors are not collinear, then pixel x is considered to have changed.

To further enhance the removal of common elements from the intermediate frames, the pixels in the intermediate frame to be subtracted from the other intermediate frame can have their area of coverage increased using mathematical morphology operations such as dilation. The are of coverage of the pixels can therefore be dilated several times prior to the subtraction. This will allow the dilated pixels to cover not only the changed pixels but also the pixels in the neighborhood of the changed pixels. Thus, slight deviations in the pixels (such as those caused by image noise, minor movements of the image, or minor non-correspondence between the pixels) can be removed by the dilated pixels.

As noted above, the above process can be used to detect minute or subtle observable changes in video. This is illustrated in the sequence of images in FIG. 4, in which a diskette moves with respect to the camera, with the protective cover sliding rapidly at some point from an open to a close position.

Figure 4:
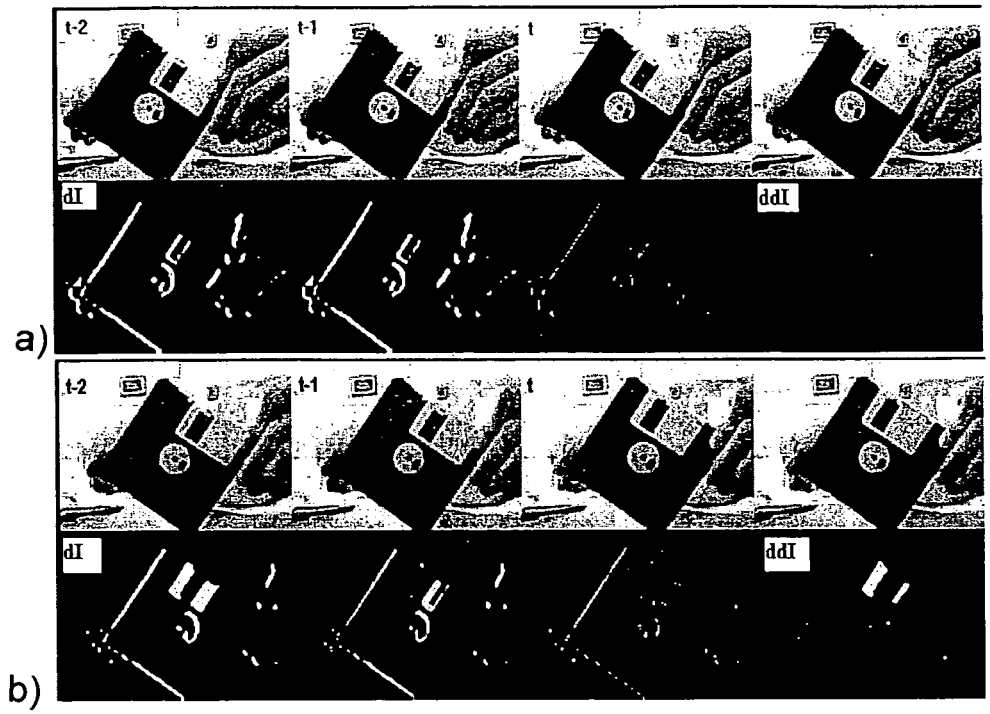
FIG. 4 is a sequence of images obtained through the procedure of the invention.

FIG. 4 shows the results of the first-order change detection and the second order change detection in the lower black-and-white rows of the images at the left and right corners, respectively: no local change is observed in (a) in ddI image, while the local change due to the cover sliding is detected in (b) clearly seen in image ddI. The upper row of snapshots shows the second last, last and current video frames used to computer the second-order change. The pixels changed due to the global motion, as detected and removed by the steps detailed above, are shown in the middle left and middle right images of the lower rows.

As noted above, the above process can be used to detect changes in the state of the eyes. Thus, to detect a blink, two state changes have to be found—a change from an open state to a closed state and a change from the closed to an open state. This double change must be found within a specific time period to qualify as a blink. If only half of the two state changes are found in the given time frame, then it means the subject has merely closed his eyes. As is known, a regular blink is an involuntary human action while a double blink is usually a deliberate action which most people are capable of. Because of this, a double blink can be used as a hands-free alternative to a mouse click. To detect a double blink, the two state changes corresponding to a blink have to be repeated within a given time frame. Thus, a blink must first be detected and, in the given time frame, the blink must be repeated. A double blink therefore means several state changes observed within a given time period.

The time period for the blinking can be determined by knowing the frame rate of the video camera being used. If the video camera is a digital video camera with a frame capture rate of 10 frames per second, then three frames account for three-tenths of a second. Given that the normal duration of a regular blink is measured in the milliseconds, multiple changes due to several blinks can be detected with in a 1 or 2 second time period.

Since the described change detection technique does not differentiate between the closing or the opening of the eyes, the open or closed state of the eyes can, if needed, be computed by using the colour information of the pixels where the change is detected. If the colour is similar to the colour of the human skin, then the eyes have been closed, otherwise they have been opened. For such skin color comparisons, the work of Terrillon et al can be consulted. (J.-C. Terrillon, M. Shirazi, H. Fukamachi, and S. Akamatsu, "Comparative performance of different skin chrominance models and chrominance spaces for the automatic detection of human faces in color images", Proc. of 4th Int. Conf. on Automatic Face and Gesture Recognition (FG 2000)}.

Once the process above is used, the end video image, which shows the second-order change detected in video, can be analyzed to compute the locations of the detected changes. For video which shows eye blinks, these locations will correspond to the locations of the eyes. The centers of such two locations can be computed using generic clustering techniques such as Nearest Neighbor clustering or Vector quanitzation.

If there is more than just change due to the eye blinks observable in video—for example, the flag is being waved by wind in the background, then face detection techniques such that as that described by Shakhnarovich et al may be used to isolate or narrow the area of interest to where a face is, prior to executing the described change detection technique in order to detect blinks. (G Shakhnarovich, P. A. Viola, and B. Moghaddam, "A unified Learning Framework for Realtime Face Detection and Classification", Intern. Conf. on Automatic Face and Gesture Recognition, USA, 2002)

The above process can be used continuously for the above application as frames are captured by the digital camera being used. Thus, frames may be buffered and suitable software, and the hardware required to implement the process, simply selects a three frame subset of the buffered frames to analyze. These three frame subsets may overlap to ensure that a user input (a deliberate blink) is not missed. Thus, if a 10 frame buffer is used, the software will select the least recently acquired frame, the second least recently acquired frame, and the third least recently acquired frame as the first subset. The second subset would be the second least recently acquired frame, the third least recently acquired frame, and the fourth least recently acquired frame and so on. For a system that has a faster frame acquisition rate, the overlaps may not be required.

It should also be noted that while the above description describes using the invention for black and white and gray scale video frames, color video frames may also be used with some suitable adjustments. These adjustments may include matching the color between the images prior to the image subtraction step to ensure that the image subtraction will be effective. Alternatively, the color video frames may be converted to black and white frames prior to their processing. This will simplify the implementation of the above invention as color matching can sometimes be difficult to perform.

While the above application of the invention is provided merely for illustrative purposes, other applications may also be possible. Specifically, the process may be used to determine if minute changes have occurred between images that are not necessarily consecutive. As an example, satellite image analysis may use the above process to determine if minute changes have occurred between three different instances in time. Three different satellite images of the same geographical location, taken at different times, may be used to determine if features in the images have moved, been added, or been removed. Such differences can indicate activity and/or developments at that geographical location.

Further to the above, it should be clear that the above process may be applied to not only video frames but to any subset of still images for which differences between the images is desired to be found. The satellite image example given above is merely one of the possible applications of the invention to still images as opposed to captured video frames.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

I claim:

1. A method of detecting changes in video, the method comprising:
    (a) obtaining at least three video frames;
    (b) selecting one of said at least three video frames as a starting video frame;
    (c) selecting a second one of said at least three video frames as an ending video frame;
    (d) selecting a third one of said at least three video frames as a middle video frame, said middle video frame being between said starting video frame and said ending video frame in a time sequence of said at least three video frames;
    (e) creating a first intermediate image based on differences computed between said starting video frame and said middle video frame;
    (f) creating a second intermediate image based on differences computed between said middle video frame and said ending video frame;
    (g) determining a geometric transformation such that when said geometric transformation is applied to said second intermediate image, an overlap between images in said first intermediate image and images in said second intermediate image is maximized;
    (h) applying said geometric transformation to said second intermediate video frame to result in a transformed image;
    (i) constructing an end image based on similarities between said first intermediate image and said second intermediate image such that active pixels common to both intermediate images are inactive in said end image.

2. A method according to claim 1 wherein said video frames are digitized.

3. A method according to claim 2 wherein said video frames are in gray scale.

4. A method according to claim 1 wherein said intermediate images are binary images.

5. A method according to claim 4 wherein pixels in said intermediate images for which differences are computed are given a first value and pixels in said intermediate images for which differences are not computer are given a second value.

6. A method according to claim 1 wherein steps e) and f) are accomplished by using predetermined criteria to determine if a pixel in one frame is different from a corresponding pixel in another frame such that if said pixels are different, then a corresponding pixel in an image being created is active.

7. A method according to claim 6 wherein said predetermined criteria includes determining if pixels surrounding said first pixel have changed non-linearly to determine if said first pixel differs from said corresponding second pixel.

8. A method according to claim 6 wherein said predetermined criteria includes a predetermined threshold such that said first pixel is different from said second pixel only if a difference between said pixels exceeds said predetermined threshold.

9. A method according to claim 1 wherein said geometric transformation is a linear translation.

10. A method according to claim 9 wherein said linear translation is a vector V(vi,vj) such that said translation maximizes an overlap between corresponding pixels in the first intermediate image and the second intermediate image after said second intermediate image is shifted by said vector.

11. A method according to claim 10 wherein said overlap is calculated as a sum of absolute differences between said corresponding pixels.

12. A method according to claim 1 wherein said geometric transformation includes a rotation such that when a rotation matrix representing said rotation is applied to said second intermediate image, said second intermediate image is rotated by a given angle R.

13. A method according to claim 1 wherein said geometric transformation is a combination of a rotation and a linear translation.

14. A method according to claim 1 wherein said geometric transformation maximizes an overlap between corresponding pixels in the first intermediate image and in the second intermediate image after said geometric transformation is applied to said second intermediate image.

15. A method according to claim 14 wherein each pixel U(i,j) in said second intermediate image is transformed into a new pixel U' (i', j') after said geometric transformation is applied to said second intermediate image, said new pixel being defined by $$i'=\cos R*i+\sin R*j+vi$$

$$j'=\sin R*i-\cos R*j+vj$$

where R is a rotation angle and V(vi,vj) is a vector which corresponds to the linear translation referred to above.

16. A method according to claim 1 further including the step of processing one of said intermediate images prior to creating said end image.

17. A method according to claim 16 wherein said step of processing increases an area of coverage of each pixel of said intermediate image being processed.

18. A method according to claim 17 wherein said intermediate image being processed is said transformed image.

19. A method according to claim 18 wherein said step of processing dilates each pixel of said intermediate image being processed.

20. A method according to claim 1 wherein all of said at least three video frames contains an image of a human face.

21. A method according to claim 20 wherein said changes being detected is a change in an open or closed state of at least one eye in said human face.

22. A method according to claim 21 wherein said method is continuously executed to detect at least one change in a state of at least one eye in said human face.

23. A method according to claim 22 wherein said method detects multiple changes in said state.

24. A method according to claim 23 wherein said method detects at least two blinks in a specific predetermined time period.

* * * * *